United States Patent [19]

Johnson

[11] 4,278,134

[45] Jul. 14, 1981

[54] IMPLEMENT FOR SMOOTHING PARTICULATE MATERIAL SURFACES

[76] Inventor: David B. Johnson, 18 Goldsmith Ave., London NW9 7HB, England

[21] Appl. No.: 55,623

[22] Filed: Jul. 9, 1979

[30] Foreign Application Priority Data

Jul. 14, 1978 [GB] United Kingdom ............... 29956/78

[51] Int. Cl.³ ................................................ A01B 1/00
[52] U.S. Cl. .................................. 172/373; 273/32 B; 241/169.2; 294/19 A
[58] Field of Search .................... 273/162 E, 32 B; 294/19 A; 172/371, 372, 373, 374, 376, 381; 241/169.2, 168

[56] References Cited

U.S. PATENT DOCUMENTS

| | | | |
|---|---|---|---|
| 1,085,505 | 1/1914 | Stafford | 172/371 |
| 1,286,693 | 12/1918 | Buisson | 172/376 X |
| 1,384,220 | 7/1921 | Sykes | 172/378 X |
| 2,116,651 | 5/1938 | Ackerson | 273/162 E |
| 2,207,315 | 7/1940 | Dodd et al. | 294/19 A X |
| 2,233,682 | 3/1941 | Welcome | 172/373 |
| 2,694,880 | 11/1954 | Artese et al. | 273/32 B X |
| 3,437,368 | 4/1969 | Anderson | 294/19 A |

FOREIGN PATENT DOCUMENTS

| | | | |
|---|---|---|---|
| 2791 | of 1902 | United Kingdom | 294/19 A |
| 608387 | 9/1948 | United Kingdom | 241/169.2 |
| 618185 | 2/1949 | United Kingdom | 241/169.2 |
| 858648 | 1/1961 | United Kingdom . | |

Primary Examiner—George J. Marlo
Attorney, Agent, or Firm—Schwartz & Weinrieb

[57] ABSTRACT

A rake for smoothing sand and other particulate material surfaces has a head which is an elongate helical coil. Preferably, the coil is a coil spring which can be compressed axially from an open to a storage condition and means are provided for retaining the spring in its storage condition and advantageously also in intermediate operative conditions to compensate for variations in coarseness of the particulate material to be raked. It is also preferred that the rake handle is formed of a mutually inclined pair of arms movable to reduce their included angle and having the coil spring extending between their distal ends. It is especially preferred that the arms are arcuately mutually divergent so that the distal ends thereof move substantially linearly.

12 Claims, 5 Drawing Figures

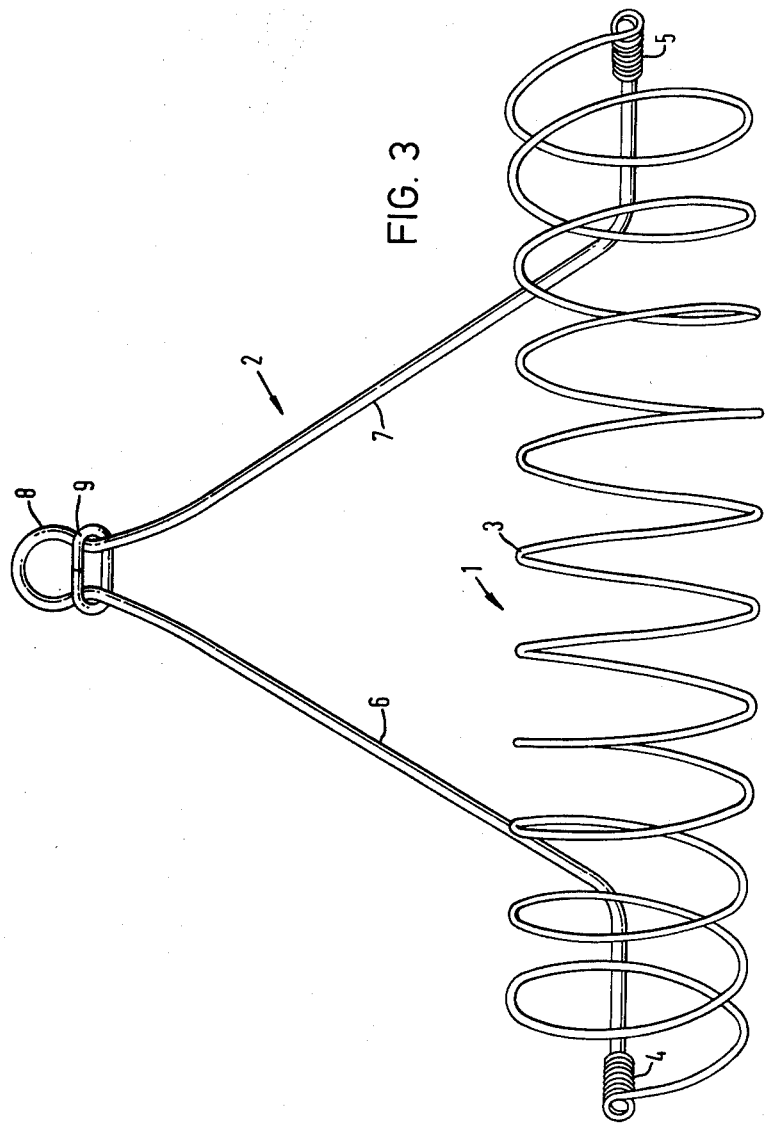

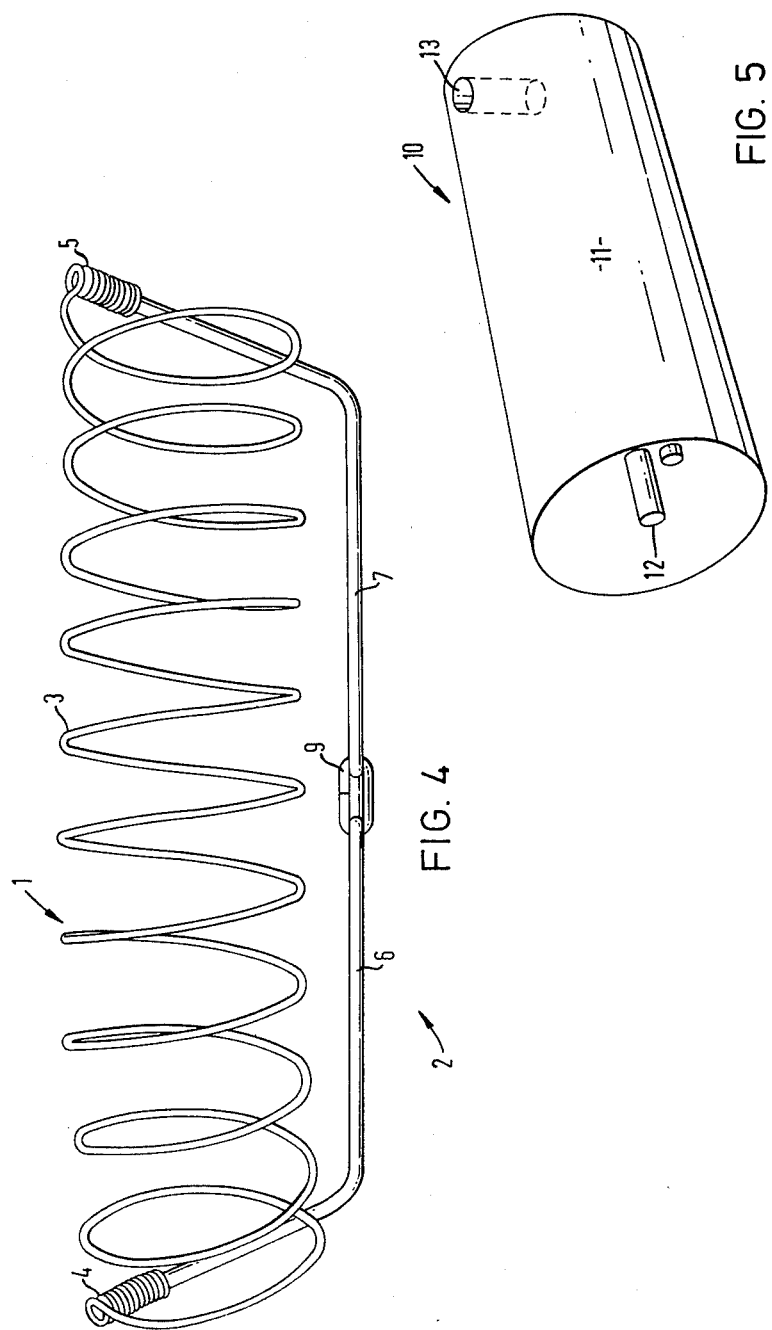

IMPLEMENT FOR SMOOTHING PARTICULATE MATERIAL SURFACES

FIELD OF THE INVENTION

The present invention relates to an implement for smoothing the surface of particulate material, especially, but not exclusively, sand in golf course bunkers.

BACKGROUND OF THE INVENTION

Golf courses have so-called "bunkers" which are sandpits provided to constitute hazards for players. When a golf ball lands in a bunker, it has to be struck from the bunker using a golf club. Inevitably, the ball and/or the club disturb the surface of the sand in the bunker as do the feet of a player entering the bunker to play the ball. Accordingly, it is necessary to subsequently smooth out the surface of the sand in the bunker to ensure that the bunker constitutes a uniform hazard for all players. Conventional rakes are generally used for this purpose and are intended to be provided at each bunker. However, the rakes are often removed by thieves or vandals. It has been proposed to provide players with small and/or collapsible rakes to be carried by them for their personal use in smoothing sand in bunkers. Such rakes are not entirely satisfactory since they have prongs which can damage golf bags in which they are carried and cause injury, albeit minor, to a player who inadvertently grasps or otherwise engages the prongs. Furthermore, such rakes are not adjustable to compensate for variations in coarseness of sand resulting, for example, from changes in the moisture content thereof.

OBJECTS OF THE INVENTION

It is an object of this invention to provide an implement for smoothing sand or other particulate material surfaces which implement does not have prongs.

It is a further object of the invention to provide an implement for smoothing sand and other particulate material surfaces which implement readily can be adapted to compensate for changes in material coarseness.

It is another object of the invention to provide an implement for smoothing sand and other particulate material surfaces which implement readily can be adapted to collapse for storage and/or transport.

SUMMARY OF THE INVENTION

According to the present invention, there is provided an implement for smoothing the surface of particulate material, said implement comprising a particulate material-engaging head carried by and extending laterally from a handle adapted to be gripped by a user of the implement, characterised in that said head comprises an elongate helical (as hereinafter defined) coil for engaging the particulate material. Preferably, but not necessarily, the implement is collapsible for storage. As used in this Specification, the term "elongate helical" means having the shape of a helix in which adjacent turns are spaced along their common axis.

Preferably, the head is a coil spring which can be compressed axially from an open operative condition to an at least partially closed storage condition and retaining means is provided for retaining the spring in its storage condition. Advantageously, said means also can retain the spring in one or more compressed operative conditions intermediate said open operative condition and said storage condition to permit of adjustment of the implement to compensate for changes in the coarseness of particulate material whose surface is to be smoothed by the implement. Suitably, the head can be formed of stainless steel wire although other elongate materials, for example, plastics covered wire or nickel plated spring steel, can be used. Conveniently, the head may be formed of elongate material having a diameter of up to 5 mm, preferably 1 to 3 mm and especially about 2 mm. The helical head may have an outer diameter of up to 12 cm, preferably 5 to 8 cm, especially about 6 cm, and an open length of 10 to 40 cm, preferably 18 to 30 cm, especially about 24 cm. The spacing between adjacent turns in the open head may be 1 to 4 cm, preferably 2 to 3 cm, especially about 2½ cm. The common axis of the head may be straight although it may be arcuate.

Preferably, the handle comprises a pair of arms attached to respective ends of the head and it is particularly preferred that said arms are mutually adjustable to permit of compression of the head. In the latter case, the retaining means referred to previously can act on the arms to retain them in a configuration or configurations corresponding to the compressed condition or conditions of the head. Suitably, the handle can be formed of stainless steel wire, or other elongate material, for example plastics covered wire or nickel plated spring steel, bent into a generally "V"-shaped configuration and the retaining means can be a ring encircling the resultant arms and slidable thereon to vary the included angle between them. Conveniently, the elongate material has a diameter of 3 to 8 mm, preferably 4 to 6 mm, especially about 5 mm, each arm has a length of 30 to 60 cms, preferably 40 to 50 cms, especially about 45 cm, and the included angle in the open condition of the head is up to 90°, preferably 10° to 30°, especially about 20°. It is especially preferred that the arms diverge arcuately from each other so that the head ends thereof move substantially linearly between the said open and storage conditions. When the head is a coil spring and the handle comprises a pair of arms, it is preferred that the coil spring is attached to the arms by respective secondary end coils which are integral with the coil spring and extend radially inwardly thereof and resiliently engage around the end of the respective arm.

In order to facilitate carrying the implement, it is preferred that its overall length is less than 90 cms, preferably 30 to 70 cm, especially about 50 cms and that the largest outer diameter of the implement in its storage condition is less than 31.5 mms so that the handle can be received in a golf bag tube of standard size (i.e. 31.75 mm inner diameter).

Preferably, the handle is bent at the head end thereof so that the axis of the helical head is not coplanar with the main body of the handle.

According to a much preferred embodiment of the present invention, there is provided a collapsible implement for smoothing the surface of a sandpit, the implement comprising a sand-engaging head carried by and extending laterally from a handle adapted to be gripped by a user of the implement characterised in that, when considered in its open operative condition, the handle has a mutually inclined pair of arms which are relatively movable to reduce the included angle therebetween, the head comprises an elongate helical (as hereinbefore defined) coil spring extending between the distal ends of the said arms and compressible to a compressed storage condition upon moving the arms to reduce their included angle, and retaining means is provided to retain the arms at the included angle corresponding to said storage condition of the spring. It is especially preferred that said retaining means is a ring slidable relative to said arms to encircle and retain the arms over a range of included angles between those corresponding to the open and storage conditions of the spring.

BRIEF DESCRIPTION OF THE DRAWINGS

The following is a description, by way of example only and with reference to the accompanying drawings, of an implement in accordance with the presently preferred embodiment of the invention. In the drawings:

FIG. 3 is an end view from the head end of the implement of FIG. 1 with the handle in its normal operative attitude;

FIG. 4 is an end view from the head end of the implement of FIG. 1 with the handle extending horizontally; and FIG. 5 is a perspective view of a mandrel for use in winding the spring coil head of the implement of FIG. 1.

DETAILED DESCRIPTION OF THE PREFERRED EMBODIMENT

Figure 1:
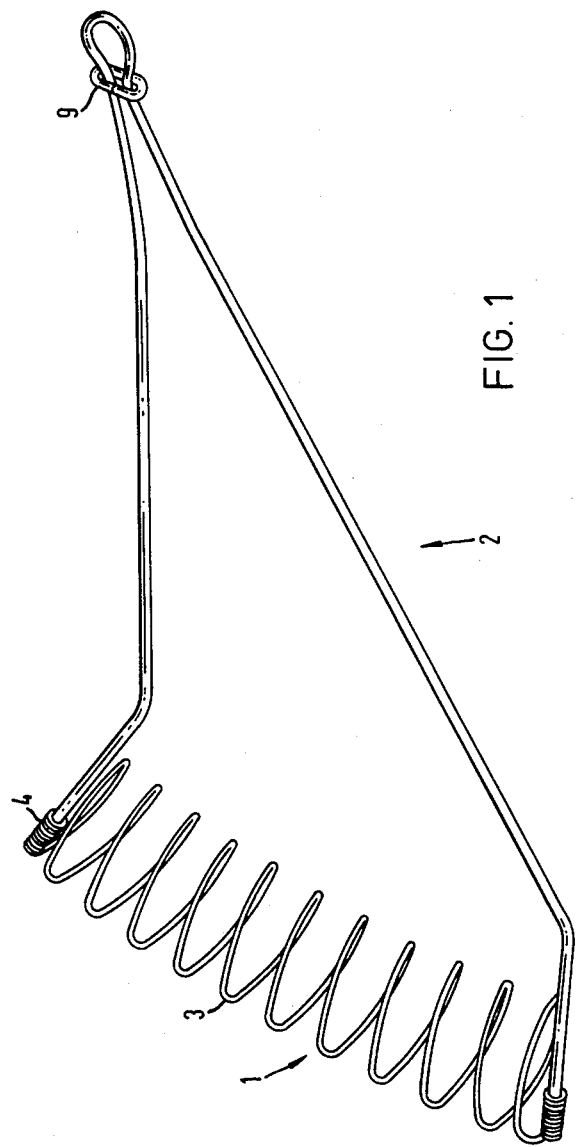
FIG. 1 is a perspective view from above of the implement in its open operative configuration.
Figure 2:
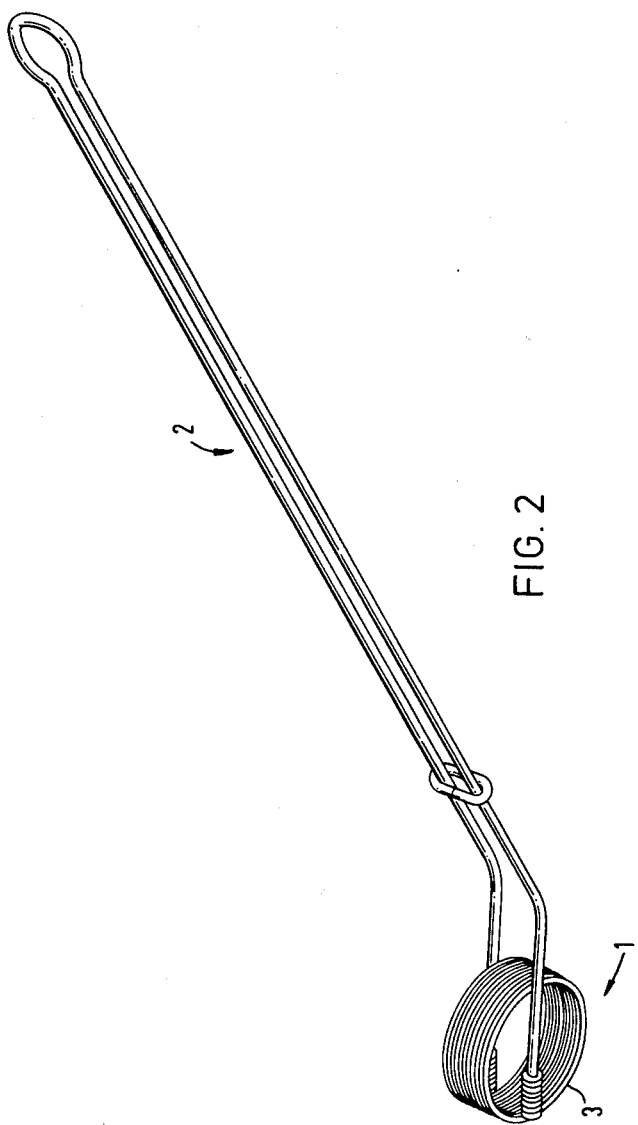
FIG. 2 is a perspective view corresponding to FIG. 1 showing the implement in its collapsed configuration.

Referring first to FIGS. 1 to 3, an implement specifically designed for smoothing sand in golf-course bunkers comprises a head 1 carried by and extending laterally from a handle 2. The head 1 consists of an elongate helical coil spring 3 having the respective ends 4, 5 thereof extending radially inwardly relative to the coil 3. Each end 4, 5 is formed as a minor coil with adjacent turns abutting and the said coil receives and grips about a tapered distal end of a respective arm 6, 7 of the handle 2. The arms 6, 7 are joined at their proximal ends by an arcuate portion 8 of the handle 2. The arms 6, 7 are slightly bent arcuately outwardly over a portion thereof towards their proximal ends and are bent at their distal ends. A ring 9 encircles the arms 6, 7 and is slidable along the arms between the respective positions shown in FIGS. 1 and 2.

The head 1 is formed by winding metal wire about a mandrel 10 shown in FIG. 4. The mandrel 10 has a cylindrical main body 11 from one end of which protrudes an offset axially extending peg 12. A cylindrical blind bore 13 of larger diameter than peg 12 extends radially into the body 11 near the other end of the body to peg 12. When using the mandrel 10, an end 4 of the coil 3 is formed by winding wire around the peg 12. The resultant coiled end 4 is removed from the peg 12 and inserted into the bore 13, whence the main part of coil 3 is formed by winding the wire around the body 11. End 5 is subsequently formed by winding the remaining end of the wire about the peg 12, axially extending the coil 3 to remove the coiled end 5 from the peg 12 and then bending the end 5 to extend radially inwardly of the coil 3.

In use of the implement shown in the drawings, it is gripped in its open condition shown in FIG. 1 and with the distal end of the handle arms 6, 7 extending downwardly by a user placing his forefinger between the arms 6, 7 adjacent the arcuate portion 8 and gripping the end of the handle with said portion abutting the palm of the hand. The implement is then moved backwards and forwards with the coil 3 resting on the surface of sand in a golf course bunker to smooth the surface. At the edges of the bunker, the implement can be moved up and down to produce a smooth non-horizontal surface. Surprisingly, it has been found that the implement is particularly efficient (relative to a conventional rake) in raising sand to smooth out non-horizontal surfaces.

When the bunker sand has been smoothed out, the arms 6, 7 can be moved together to compress the coil 3 to the compressed condition shown in FIG. 2. The ring 9 can then be slid along the arms 6, 7 towards the head 1 to a position where it retains the arms in the collapsed configuration of the handle corresponding to said compressed condition of the coil (as also shown in FIG. 2). If the sand in the bunker is damp, the increased coarseness can be compensated for by adjusting the arms 6, 7 to an intermediate position where the spring 3 has the desired degree of compression and then sliding the ring 9 along the arm to a position where the arms are retained in said intermediate condition.

In a typical implement illustrated in FIGS. 1 to 3, the coil 3 is formed of 14 SWG, (i.e. 2.032 mm) diameter stainless steel wire and has 11 turns of 6.35 cm outer diameter with a free length of 24.13 cm. The handle 2 is formed of 4.75 mm diameter stainless steel wire bent with an arcuate portion 8 of 9.5 mm internal diameter. The arms 6, 7 are 45 cm long and are curved arcuately outwardly from each other along a 10 cm length of a respective arc of a 56 cm radius circle commencing at a distance of 4 cm from the arcuate portion 9 so that their included angle at their distal ends is 20° compared with only 10° at their proximal ends. The arms 6, 7 are also bent at an angle of 40° at a distance of 9 cm from the distal ends thereof. The ring 9 is formed of 3.175 mm diameter stainless steel wire bent into a flattened ring of 5.5 mm internal width and 17.5 mm distance between centres of curved ends of the rings. The overall dimensions of the implement in its open configuration are 47.5 cm length, 6.35 cm depth and 28 cm head span. When the implement is in its collapsed condition, the handle 2 will fit into a standard 31.5 mm diameter golf bag tube.

It will be appreciated that the invention is not restricted to the particular details described above but that numerous modifications and variations can be made without departing from the scope of the invention as claimed in the following claims.

I claim:

1. An implement for smoothing the surface of particulate material, such as, for example, sand in sand bunkers of a golf course, comprising:

handle means adapted to be gripped by a user of said implement and comprising a pair of arms, one end of each arm being substantially fixed relative to the corresponding one end of the other arm, while the opposite ends of said arms are relatively movable between an expanded, operative state at which said arms diverge with respect to each other, and a collapsed, storage state at which said arms are substantially parallel to each other;

a particulate material-engaging head carried by, and extending laterally between, said opposite ends of said handle means arms, said head comprising a helical coil compression spring in which adjacent turns of said coil are spaced along a common axis for engaging said particulate material, and wherein said coil head is axially expansible and compressible between an expanded, operative state corresponding to said expanded, operative state of said handle means arms, and a contracted, storage state corresponding to said collapsed storage state of said handle means arms; and means disposed upon said handle means arms for retaining said compression coil spring head and said handle means arms in a compressed and contracted, and collapsed state, respectively.

2. The implement according to claim 1 wherein the said retaining means also can retain the spring in one or more compressed operative conditions intermediate said open operative condition and said storage condition.

3. The implement according to claim 1 wherein the handle comprises a length of elongate material bent into a generally "V"-shaped configuration to provide the said arms and the retaining means comprises a ring encircling the arms and slidable thereon to vary the included angle between them.

4. The implement according to claim 3 wherein said arms diverge arcuately from each other whereby the head ends thereof move substantially linearly between the said open and storage conditions.

5. The implement according to claim 3 wherein the coil is formed of elongate material having a diameter of 1 to 3 mm; the coil has an outer diameter of 5 to 8 cm and an open length of 18 to 30 cm with 2 to 3 cm spacing between turns in the open head; the arms are formed of elongate material having a diameter of 4 to 6 mm; each arm has a length of 40 to 50 cms; the included angle between the arms in the open condition is 10° to 30°; the overall length of the implement is 30 to 70 cms; and the largest diameter of the implement in the storage condition is less than 31.5 mm.

6. The implement according to claim 3 wherein the coil spring is attached to the arms by respective secondary end coils which are integral with the coil spring and extending radially inwardly thereof and resiliently engage around the end of the respective arm.

7. The implement according to claim 1 wherein the handle is bent at its head end whereby the common axis of the helical head is not coplanar with the main body of the handle.

8. The implement according to claim 1 wherein said retaining means is a ring slidable relative to said arms to encircle and retain the arms over a range of included angles between those corresponding to the open and storage conditions of the spring.

9. The implement according to claim 1 wherein the arms have an included angle of about 10° at their proximal ends and an included angle of about 20° at their distal ends.

10. An implement as set forth in claim 1, wherein:
said handle means arms are resiliently mounted upon said handle means.

11. An implement for smoothing the surface of particulate material, such as, for example, sand in sand bunkers of a golf course, comprising:

handle means adapted to be gripped by a user of said implement and comprising a pair of arms, one end of each arm being substantially fixed relative to the corresponding one end of the other arm, while the opposite end of at least one arm is movable relative to the corresponding opposite end of the other arm as well as to said one end of each arm such that said arms are relatively movable between an expanded, operative state at which said arms diverge with respect to each other, and a collapsed, storage state at which said arms are substantially parallel to each other;

a particulate material-engaging head carried by, and extending laterally between, said opposite ends of said handle means arms, said head comprising a helical coil compression spring in which adjacent turns of said coil are spaced along a common axis for engaging said particulate material, and wherein said coil head is axially expansible and compressible between an expanded, operative state corresponding to said expanded, operative state of said handle means arms, and a contracted, storage state corresponding to said collapsed storage state of said handle means arms; and means disposed upon said handle means for retaining said compression coil spring head and said handle means arms in a compressed and contracted, and collapsed state, respectively.

12. An implement as set forth in claim 11, wherein:
said at least one arm is resiliently mounted upon said handle means.

* * * * *